H. C. EGERTON.
WEATHER STRIP.
APPLICATION FILED OCT. 15, 1918.

1,352,732.  Patented Sept. 14, 1920.

Inventor
Henry C Egerton
By his Attorney
Harry L Duncan

UNITED STATES PATENT OFFICE.

HENRY C. EGERTON, OF RIDGEWOOD, NEW JERSEY.

WEATHER-STRIP.

1,352,732.

Specification of Letters Patent.   Patented Sept. 14, 1920.

Application filed October 15, 1918. Serial No. 258,277.

*To all whom it may concern:*

Be it known that I, HENRY C. EGERTON, a citizen of the United States, and resident of Ridgewood, county of Bergen, State of New Jersey, have made a certain new and useful Invention Relating to Weather-Strips, of which the following is a specification, taken in connection with the accompanying drawing.

This invention relates especially to yieldable closing or packing strips, such as are particularly adapted for use as weather strips or finishing strips and in which fabric or other fibrous material impregnated with or carrying cured phenolic condensation cementing material is used to stiffen and strengthen the body of the strip which may also comprise a metallic member, if desired. One or more strips of canvas or other suitable fabric, impregnated with such phenolic condensation cementing material as bakelite, condensite or redmanol varnish compositions may advantageously be used to give stiffness and strength to the body of such weather strips and vulcanized rubber constituting the flexible or yieldable closing edge portions may be securely and permanently united to such body portions in connection, if desired, with an interposed connector member of fabric which is originally provided with a frictioned or other coating of rubber on the side with which the vulcanized rubber facing of the weather strip engages.

In the accompanying drawings showing in a somewhat diagrammatic way illustrative embodiments of the invention, Figure 1 is a perspective view showing one form of weather strip.

Figure 1:
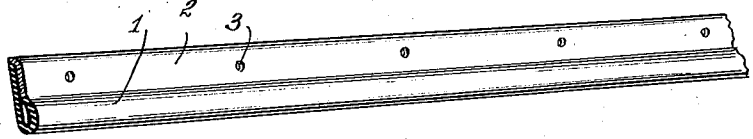
Figure 2:
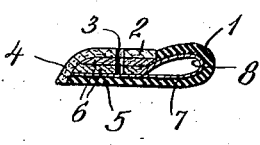
Fig. 2 is an enlarged transverse section thereof.

As indicated in Fig. 1, the weather strip may have a yieldable closing edge portion 1 consisting of or comprising considerable vulcanized soft rubber and the body portion 2 connected therewith and acting as a supporting member therefor contains suitable stiffening and strengthening elements so as to hold the strip in the desired close contact with the window casing or other members when nails or other securing devices are used in connection with the securing apertures 3 which may, if desired, be formed along the body of the strip at suitable intervals. As indicated more in detail in Fig. 2 the vulcanized rubber edge portion 1 may be secured to a connector fabric 7 of canvas or other suitable material preferably preliminarily provided with a frictioned or other coating of rubber thereon and this rubber facing and connector member may in some cases be folded over at the yieldable closing edge so as to form an aperture 8 and promote the extent of resilient and yielding engagement which the strip can have. The rubber facing and also the connector strip, if desired, may in some cases be advantageously carried beneath the body of the weather strips so as to form a sealing portion 5 at this point. The body or supporting portion of the strip is preferably reinforced by one or more body strips 2, 6 of any suitable fibrous material, such, for instance, as heavy canvas, which is preferably thoroughly impregnated with bakelite varnish No. 1, for instance, and dried before being assembled with the other elements and molded together in any suitable way at the usual vulcanizing temperatures of soft rubber so as to cement or secure all the parts together. A heat of 270° to 320° F. for half an hour or an hour is sufficient for this purpose with the usual compositions, and it is desirable to hold the parts securely in place and under considerable pressure during this heat curing treatment for best results. If desired, the nailing or securing holes or apertures 3 may be produced by forming the molds with suitable pins projecting more or less through the body portion of the fabric and such pins may of course act as locating pins in the mold to facilitate the assembly of the various strips or elements. It is for some purposes advantageous to have one or more of the body strips extend over the rear edge of the weather strip as at 4 so as to give a smooth finish and a curved or other form of molding may be used at this point, if desired. It is of course understood that any desired coloring matter may be incoporated in the bakelite or other phenolic condensation cementing material used and that any exposed body or stiffening strips may be dyed or colored before being impregnated with such cementing material, so that any desired color and appearance may be given to the exposed body portions of the strip, the exposed rubber facing being similarly colored, if desired.

Figure 3:
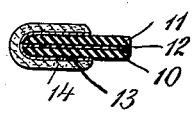
Figs. 3 to 9 are similar transverse sections through other forms of closing or finishing strips adapted for use as weather strips or other purposes.

Fig. 3 shows another form in which one or more rubber closing strips, such as 10, 11, are inclosed within the stiffener or body member which may consist of one or more layers of canvas or other fabric 14 folded around one edge of the vulcanized rubber and cemented thereto during the heat curing and vulcanizing process, preferably in connection with a layer 13 of connector fabric, which may have a frictioned rubber coating on the inside and be cemented to the stiffening strip during the heat curing and vulcanizing of the article. If desired, the rubber member may be given somewhat more strength in its projecting edge portion by incorporating a canvas or other strip 12 therein which may be friction coated with rubber on one or both sides before being assembled.

Figure 5:
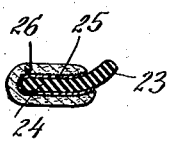

Fig. 5 shows a generally similar arrangement in which only a single yielding rubber strip 23 is used which may have its projecting portion bent upward into angular position as indicated. The other edge 24 of this strip may be inclosed by the stiffener or body fabric 26 of similarly impregnated or coated canvas or the like which is securely and permanently united to the rubber preferably in connection with an interposed connector strip or member 25. By upwardly curving the edges of the body strip adjacent the free or yielding edge 23 of the rubber the angular position thereof is maintained as definitely as desired while still allowing a considerable range of resilient yielding action to take up spaces between window sash and frame, for instance. Such a weather strip is of course reversible and may have either side of its body portion nailed or otherwise secured to the window casing.

Figure 4:
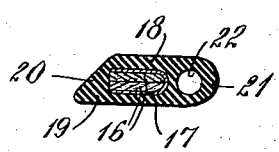
Figure 6:
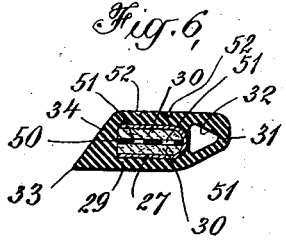
Figure 7:
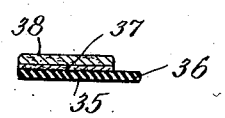

Fig. 4 shows another arrangement in which the stiffening or body member may be composed of one or more strips or layers 16 of heavy canvas or other suitable fabric or fibrous material, such as porous or open textured paper, for example, which has been impregnated or thoroughly coated or incorporated with phenolic condensation cementing material. If desired, a connector strip 17 of canvas may be applied to and more or less encircle the body member and this connector may with advantage in some cases be preliminarily coated with a frictioned coating of rubber to promote adherence of the soft rubber facing of the completed strip. This is not, however, necessary in all cases since when a suitable rubber composition is molded around and compressed against one or more strips of heavy canvas impregnated with such phenolic condensation cementing material the heat of the vulcanizing and curing operation seems to sufficiently melt or soften the phenolic condensation cementing material so that the molding pressure forces the rubber into the pores and interstices of the fabric and enables it to secure a firm grip thereon which may in many cases be ample for present purposes. The rubber facing 18 may extend over the body or stiffening member and also on the other side thereof to form the yieldable facing 19 adjacent the window frame when the weather strip is used in this position. The rubber facing also extends out to form one or more yielding and closing edge portions, such, for instance, as the angularly arranged closing edge 20 and the closing edge 21 on the other side or edge of the weather strip which may in some cases be advantageously apertured as by molding the hole or aperture 22 therein to increase the extent of its resilient yielding action. By providing a vulcanized rubber facing substantially completely inclosing the weather strip it is easily given a uniform appearance throughout and the securing nails used may be readily forced down through the exposed side of this rubber facing by countersinking them until they engage the relatively stiff strong body member when the resilient rubber facing will automatically close over small headed nails to substantially conceal them. Fig. 6 shows a generally similar arrangement in which the stiffener or body member may comprise one or more layers or strips 30 of canvas or other fibrous material carrying and thoroughly impregnated, if desired, with such phenolic condensation cementing material, and in some cases it is advantageous to incorporate within the body member or permanently secure thereto a metallic body strip or member, such as 50 which may be advantageously formed with holes or apertures 51. When said metallic member is interposed between two such strips or elements the heat curing forces the phenolic condensation cementing material through the apertures in the metallic strip or member so as to securely cement it in position and give a very great increase in the strength and security of union of the parts as compared with directly incorporating such a metallic strip in vulcanized rubber. The body portion may as indicated comprise a connector strip or layer 27 more or less inclosing the other elements and cemented thereto during the heat curing process, and if desired this connector fabric may be formed with a rubber coating to facilitate union of the vulcanized rubber facing thereto in the completed article. This rubber facing 29 may more or less completely inclose the body elements or members of the strip and may form the apertured yielding closing edge portion 31 in which a triangular or other aperture 32 may be molded. Another angularly arranged edge closing portion 34 of such yielding vulcanized rubber may be formed on the other edge of the strip, if desired, and may comprise a sharper closing edge 33 which may engage the window or other element or the closing strip may be reversed and the apertured closing edge may be brought into action according to the character of service required. This reversible weather strip also gives a neat and finished appearance, both sides being shaped so as to give good contact with the stationary surface and the rear edge of the strip may as indicated merge more or less gradually into the stationary member to which it is secured. If desired nailing or securing indications or apertures 52 may be formed in one or both sides of the strip facing so as to coöperate with the apertures 51 in any metallic body member which is used and thus facilitate the nailing or securing of the strip in place. Fig. 7 shows another form of yieldable closing or packing strip which may comprise a vulcanized rubber facing 35 vulcanized or otherwise securely united to one or more body or stiffening strips of fabric 38 carrying or impregnated with cured phenolic condensation cementing material to give the desired stiffness, a connector member 37 being interposed between these two parts to promote their union, if desired. The flexible vulcanized rubber facing may, if desired, be extended to form a yielding projecting edge 36 which may be more or less bent up to form a resilient closing portion when used as a weather strip, although, of course, this and other forms of strip described may be used for other packing and closing purposes where desired.

Figure 8:
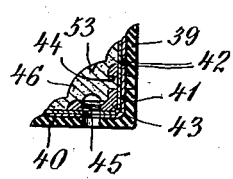
Figure 9:
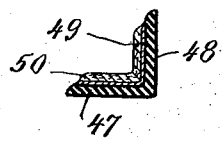

Fig. 8 shows another form of finishing strip in which the vulcanized rubber facing is angularly arranged so that its two faces 39, 40 are arranged at any suitable angles, such as a 90° angle indicated in the drawing. A connector strip 41 of fabric rubberized on its outer face, if desired, may be interposed between this rubber facing and one or more sheets or layers 42 of canvas or other fabric or fabrous material carrying cured phenolic condensation cementing material to stiffen the body portion of the strip. If desired, a metallic body member or strip 43 may be incorporated and may have holes or securing apertures 44, 45 formed at intervals along the same and preferably staggered along the strip so as not to unnecessarily weaken it at any point. Additional strips of fabric or fibrous material, such as cotton fiber, paper or paper pulp with which suitable proportions of phenolic condensation cementing material have been incorporated may be used in the body portion of this strip and may, if desired, be molded on the metallic body member so as to form a more or less ornamental molded body 46 of pleasing proportions and appearance. In some cases it is desirable to form threaded securing apertures in such a strip and for this purpose the metallic or other portions of the body member may be formed with threaded apertures 45 of this character to which access may be given from either side of the strip. In case the yielding closing strip is used as a weather strip under these conditions, nails or other securing members may be driven through such securing apertures and for this purpose an indicating aperture or mark, such as 53, may be formed in alinement with such securing aperture in the body of the strip. A closing finishing strip of this kind may also be advantageously used in other connections and if desired such a strip may be used to fill and close a corner of a show case window or the like. In such event, the edges of the plate glass are of course formed with holes through which screws or bolts may extend into the securing apertures 45 in the closing strip. Another form of yieldable rubber faced closing strip is shown in Fig. 9 as comprising the vulcanized rubber facing 47, 48 which may be angularly arranged at any desired angle and supported and stiffened by a body portion comprising one or more layers of heavy canvas or other fabric 50 carrying such phenolic condensation cementing material and vulcanized and permanently secured to the facing in connection with an interposed connector member 49, if desired. When such a strip as this is used as a weather strip it gives of course a greater extent of contact between the surfaces so as to more effectively shut out wind and cold and it may of course be used as a packing or closing strip in other connections.

This invention has been described in connection with a number of illustrative embodiments, forms, proportions, elements, parts, shapes, materials, compositions, and methods of preparation, production and use, to the details of which disclosure the invention is not of course to be limited, since what is claimed as new and what is desired to be secured by letters patent is set forth in the appended claims:

1. The reversible weather strip comprising a stiffener body member including a plurality of strips of canvas fabric containing cured phenolic condensation cementing material, a perforated metallic body member incorporated in said body and cemented between said fabric strips, a fabric connector member engaging and substantially inclosing said body member and provided on its outer surface with a frictioned rubber coating and vulcanized rubber substantially inclosing and permanently secured to said connector and body member and formed with a flexible apertured closing edge portion and with an angularly arranged edge portion on the other side of said body member.

2. The reversible weather strip comprising a stiffener body member including a strip of fabric containing cured phenolic condensation cementing material, a metallic body member incorporated in said body and cemented to said fabric strip, a fabric connector member engaging and substantially inclosing said body member and provided on its outer surface with a rubber coating and vulcanized rubber substantially inclosing and permanently secured to said connector and body member and formed with a flexible edge portion and with an angularly arranged edge portion on the other side of said body member.

3. The weather strip comprising a stiffener body member including a strip of fabric containing cured phenolic condensation cementing material, a metallic body member incorporated in said body and cemented to said fabric strip and vulcanized rubber substantially inclosing and permanently secured to said body member and formed with a flexible edge portion and with an angularly arranged edge portion on the other side of said body member.

4. The weather strip comprising a stiffener body member including a strip of fabric containing cured phenolic condensation cementing material, a metallic body member incorporated in said body and cemented to said fabric strip and vulcanized rubber permanently secured to said body member and formed with a flexible edge portion.

5. The yieldable edge closing or finishing strip comprising a stiffener body member including fabric containing cured phenolic condensation cementing material and a connected perforated metallic member, a fabric connector member engaging said body member and vulcanized rubber permanently secured to said connector and body member and formed with flexible apertured closing edge portions angularly arranged with respect to each other.

6. The yieldable closing or finishing strip comprising a stiffener body member including fabric containing cured phenolic condensation cementing material and a connected perforated metallic member and vulcanized rubber permanently secured to said connector body member and formed with flexible closing portions angularly arranged with respect to each other.

7. The reversible weather strip comprising a stiffener body member including a plurality of strips of fabric containing cured phenolic condensation cementing material, a fabric connector member engaging and substantially inclosing said body member and provided on its outer surface with a frictioned rubber coating and a vulcanized rubber facing substantially inclosing and permanently secured to said connector and body member and formed with a flexible apertured closing edge portion and with an angularly arranged edge portion on the other side of said body member.

8. The reversible weather strip comprising a stiffener body member including a plurality of strips of fabric containing cured phenolic condensation cementing material, and a vulcanized rubber facing substantially inclosing and permanently secured to said body member and formed with a flexible apertured closing edge portion and with an angularly arranged edge portion on the other side of said body member.

9. The weather strip comprising a stiffener body member including a plurality of strips of fabric containing cured phenolic condensation cementing material, and a vulcanized rubber facing permanently secured to said body member and formed with a flexible closing edge portion and with an angularly arranged edge portion.

10. The weather strip comprising a stiffening body portion including fibrous material carrying cured phenolic condensation cementing material, a perforated metallic body strip incorporated in and cemented to said body member, a vulcanized rubber facing permanently secured to said body member and having angularly disposed faces and securing apertures in said body member and metallic strip.

11. The weather strip comprising a stiffening body portion including fibrous material carrying cured phenolic condensation cementing material, and a vulcanized rubber facing permanently secured to said body member and having angularly disposed faces.

12. The yieldable closing member comprising a stiffening body portion including fabric carrying cured phenolic condensation cementing material, and a vulcanized rubber facing permanently secured to the fabric of said body member and having angularly disposed portions and securing indicating apertures in said body member.

13. The yieldable closing member comprising a stiffening body portion including fabric carrying cured phenolic condensation cementing material, and a vulcanized rubber facing permanently secured to said body member and having angularly disposed portions.

14. The yieldable closing member comprising a stiffening body portion including fibrous material carrying cured phenolic condensation cementing material, and a vulcanized rubber facing strip permanently secured to said body portion.

HENRY C. EGERTON.